(12) United States Patent
Binotto et al.

(10) Patent No.: US 10,929,792 B2
(45) Date of Patent: Feb. 23, 2021

(54) HYBRID CLOUD OPERATION PLANNING AND OPTIMIZATION

(71) Applicant: International Business Machines Corporation, Armonk, NY (US)

(72) Inventors: Alecio Pedro Delazari Binotto, São Paulo (BR); Renato Luiz De Freitas Cunha, São Paulo (BR); Eduardo Rocha Rodrigues, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 1174 days.

(21) Appl. No.: 15/134,501

(22) Filed: Apr. 21, 2016

(65) Prior Publication Data

US 2017/0270450 A1 Sep. 21, 2017

Related U.S. Application Data

(60) Provisional application No. 62/309,732, filed on Mar. 17, 2016.

(51) Int. Cl.
*G06Q 10/06* (2012.01)
*H04L 29/08* (2006.01)
(Continued)

(52) U.S. Cl.
CPC ..... *G06Q 10/06315* (2013.01); *H04L 41/046* (2013.01); *H04L 41/0806* (2013.01); *H04L 43/0876* (2013.01); *H04L 41/5003* (2013.01)

(58) Field of Classification Search
None
See application file for complete search history.

(56) References Cited

U.S. PATENT DOCUMENTS 6,877,035 B2 4/2005 Shahabuddin
9,009,697 B2 4/2015 Breiter
(Continued)

OTHER PUBLICATIONS

Jörn Altmann et al, Cost model based service placement in federated hybrid clouds. Elsevier B.V.Future Generation Computer Systems 41, 2014, pp. 79-90.

(Continued)

*Primary Examiner* — Eric W Stamber
*Assistant Examiner* — Ashley Y Young
(74) *Attorney, Agent, or Firm* — Joseph Petrokaitis; Otterstedt, Wallace & Kammer, LLP

(57) ABSTRACT

Resource usage is monitored for a hybrid cloud computing environment having on-premises computing resources and off-premises computing resources, for at least a first time period. For the time period, the amount of the on-premises computing resources and off-premises computing resources are related to the demand for computing services from the environment. Future demand for computing services from the environment is dynamically predicted based on the relating step and a learned function of the demand and/or a projection of future business growth for a business utilizing the on-premises and off-premises computing resources. Based on the predicted future demand, the amount of the on-premises computing resources is dynamically optimized for a future time period, so as to minimize costs for the future time period; and new amounts of on-premises computing resources and off-premises computing resources are provisioned for the future time period, in accordance with the optimizing step.

16 Claims, 6 Drawing Sheets

(51) Int. Cl.
    *H04L 12/26*    (2006.01)
    *H04L 12/24*    (2006.01)

(56) References Cited

U.S. PATENT DOCUMENTS

| | | |
|---|---|---|
| 9,063,789 B2 | 6/2015 | Beaty |
| 2011/0173626 A1 | 7/2011 | Chi |
| 2012/0016721 A1 | 1/2012 | Weinman |
| 2012/0054770 A1 | 3/2012 | Krishnamurthy |
| 2012/0204187 A1 | 8/2012 | Breiter |
| 2012/0221371 A1 | 8/2012 | Hegazy |
| 2012/0246638 A1 | 9/2012 | He |
| 2012/0310765 A1 | 12/2012 | Masters |
| 2013/0139152 A1* | 5/2013 | Chang ............... G06F 9/45545 718/1 |
| 2013/0198050 A1 | 8/2013 | Shroff |
| 2013/0205007 A1 | 8/2013 | Ayachitula |
| 2014/0089509 A1 | 3/2014 | Akolkar |
| 2014/0278807 A1 | 9/2014 | Bohacek |
| 2014/0282525 A1* | 9/2014 | Sapuram ............ G06Q 30/0631 718/1 |
| 2014/0330749 A1 | 11/2014 | Candas |

OTHER PUBLICATIONS

Peter Mell et al. The NIST Definition of Cloud Computing. NIST Special Publication 800-145. Sep. 2011. pp. 1-7.

* cited by examiner

| CURRENT | FUTURE |
|---|---|
| FIELDS, PATIENTS, CLIENTS | PREDICTED FIELDS, PATIENTS, CLIENTS |
| MFLOPS, STORAGE, MEMORY | PREDICTED COMPUTATIONAL RESOURCES |

*FIG. 6*

HYBRID CLOUD OPERATION PLANNING AND OPTIMIZATION

CROSS-REFERENCE TO RELATED APPLICATIONS

This application claims the benefit of U.S. Provisional Application 62/309,732 filed 17 Mar. 2016, the complete disclosure of which is expressly incorporated by reference herein in its entirety for all purposes.

STATEMENT OF GOVERNMENT RIGHTS

Not Applicable.

FIELD OF THE INVENTION

The present invention relates to the electrical, electronic and computer arts, and, more particularly, to cloud computing and the like.

BACKGROUND OF THE INVENTION

Currently, companies employ cloud computing to carry out some computations off-site, but still execute some workload on-site, in what is called a hybrid cloud environment. The common approach is to run peaks of demand in the cloud and the regular workload on the local resources. There have been many proposed strategies to optimize the usage of both environments. However, the local resources may not be well-dimensioned despite these strategies. For example, if the on-site portion is super-dimensioned, the local resources may be under-utilized. On the other hand, if the local resources are sub-dimensioned, the company or other institution will waste money due to the premium they will incur with high cloud usage.

SUMMARY OF THE INVENTION

Principles of the invention provide techniques for hybrid cloud operation planning and optimization. In one aspect, an exemplary method includes monitoring resource usage for a hybrid cloud computing environment having on-premises computing resources and off-premises computing resources, for at least a first time period; for the at least first time period, relating an amount of the on-premises computing resources and off-premises computing resources to a demand for computing services from the hybrid cloud computing environment; dynamically predicting future demand for computing services from the hybrid cloud computing environment, based on the relating step and at least one of a learned function of the demand and a projection of future business growth for a business utilizing the on-premises computing resources and the off-premises computing resources in the hybrid cloud computing environment; dynamically optimizing, based on the predicted future demand, an amount of the on-premises computing resources for a future time period, so as to minimize costs for the future time period; and provisioning new amounts of on-premises computing resources and off-premises computing resources, for the future time period, in accordance with the optimizing step.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects; for example, one or more embodiments provide any one, some, or all of the following benefits:

faster cloud adaptation;

demand forecasting—one or more embodiments predict demand—this forecast can have multiple uses within the company or other institution;

reduction of average turnaround time—in oversubscribed environments there will be still some jobs and/or tasks that are submitted to the on-premises machines; these jobs will have longer turnaround time on average—in the new buying cycle, one or more embodiments prevent this from happening;

reduction of on-premises complexity—in under-subscribed environments, the on-premises machines will be larger than required; consequently, the system complexity will be also higher than the idea case—one or more embodiments permit the new system to be smaller and therefore less complex.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 shows a table of current and future predicted demand-related parameters (fields, patients, clients) and computing resources, according to an aspect of the invention.

DETAILED DESCRIPTION OF PREFERRED EMBODIMENTS

Figure 1:
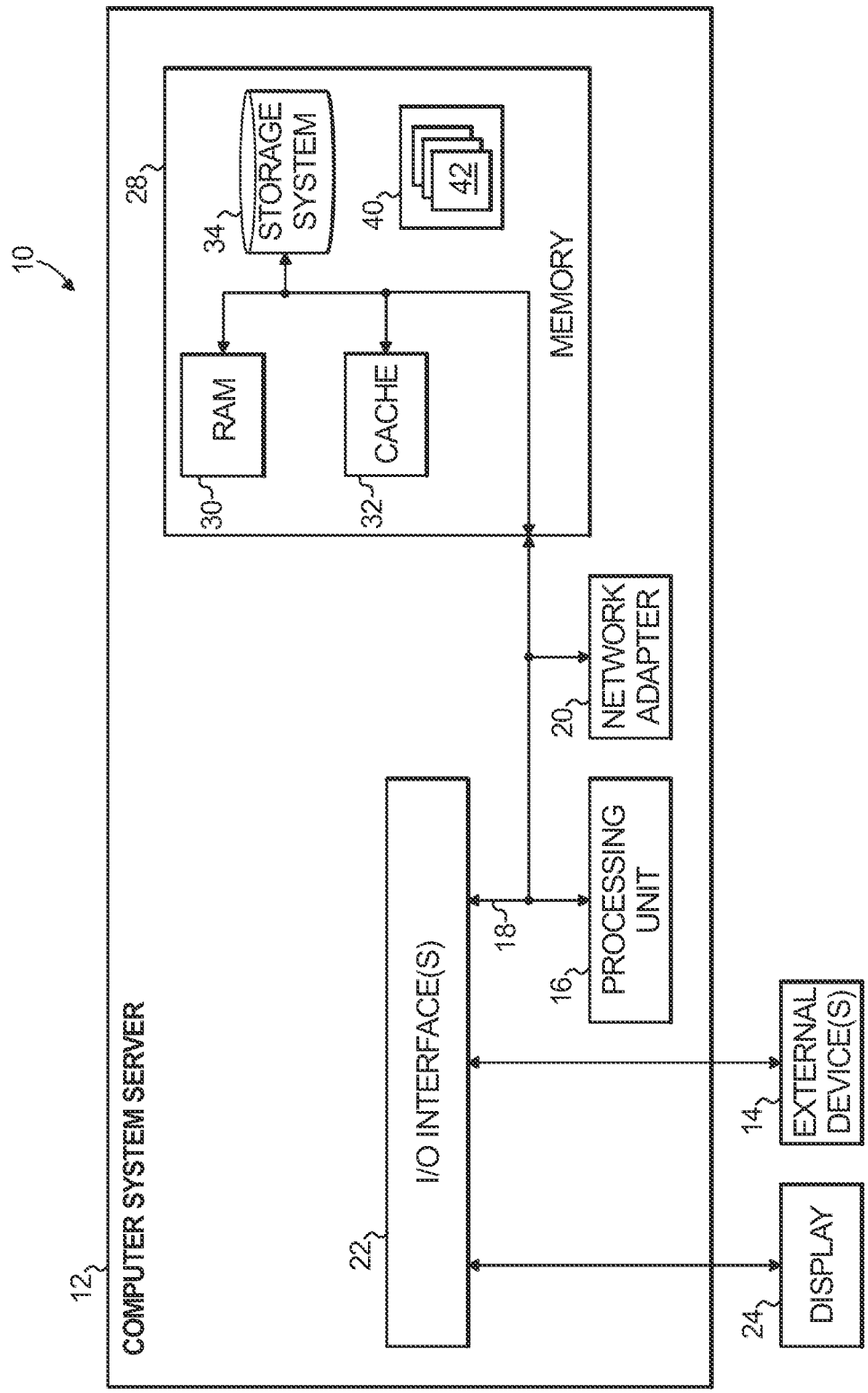
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
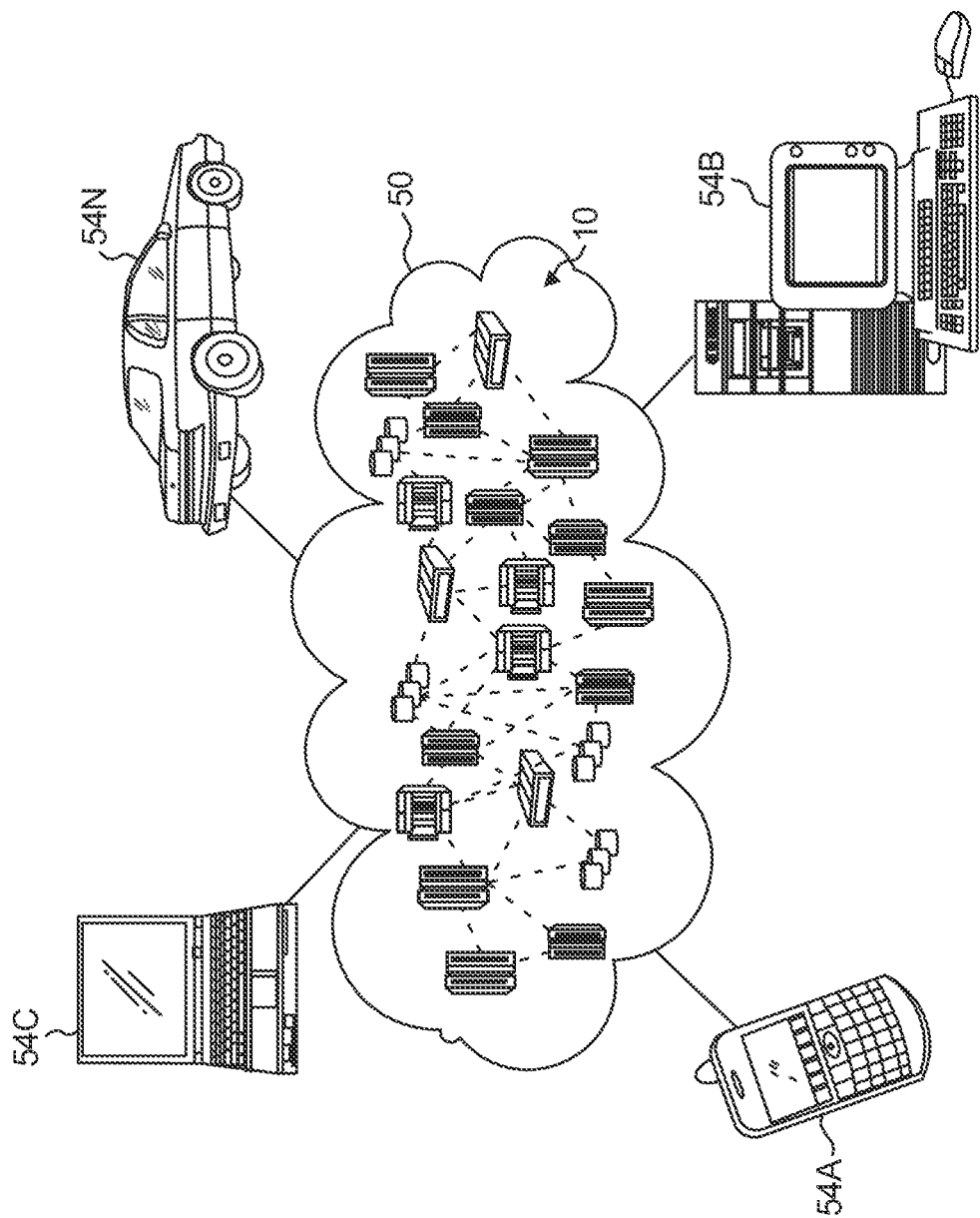
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
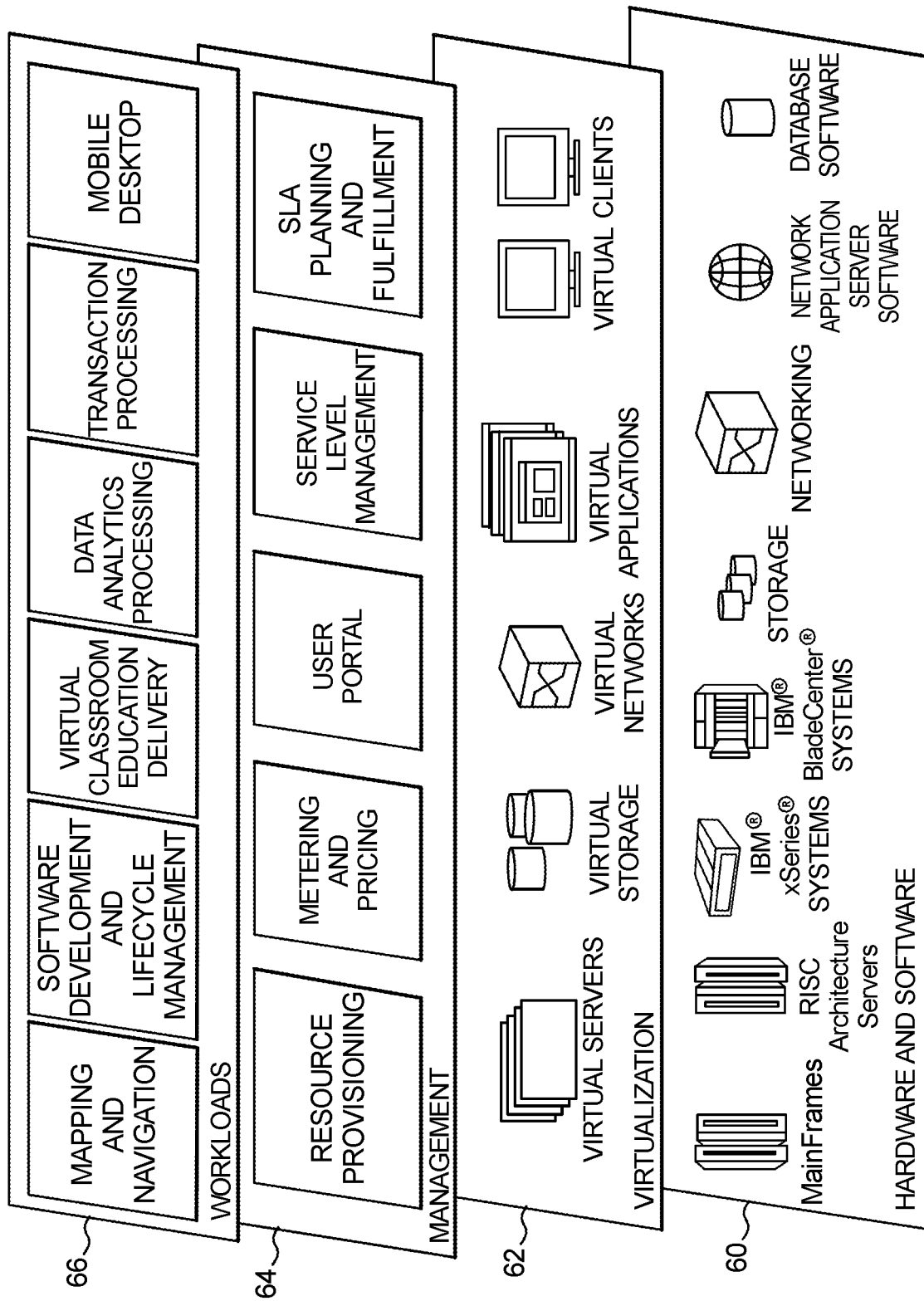
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted, currently, companies employ cloud computing to carry out some computations off-site, but still execute some workload on-site, in what is called a hybrid cloud environment. The common approach is to run peaks of demand in the cloud and the regular workload on the local resources. There have been many proposed strategies to optimize the usage of both environments. However, the local resources may not be well-dimensioned despite these strategies. For example, if the on-site portion is super-dimensioned, the local resources may be under-utilized. On the other hand, if the local resources are sub-dimensioned, the company or other institution will waste money due to the premium they will incur with constant cloud usage.

Dimensioning hybrid cloud environments is a challenging task, which involves investment planning. One or more embodiments provide a method to help institutions to analyze current usage in order to plan for future hardware acquisitions of local resources. One or more embodiments help a hybrid cloud service provider in deciding whether the local capacity should be expanded (capital expenditure (capex) for new on-premises computer resources), or whether the cloud should be used for future load. Goals can include (1) increasing profit, but this is not a requirement, (2) cost reduction, through better use of local and cloud resources that fit the internal demand, (3) better response time, by means of resizing local environment to fit demand. Some embodiments predict usage for the purpose of planning.

Thus, one or more embodiments suggest whether the local information technology (IT) environment should be improved or the institution must expand the local IT infrastructure using the public cloud (forming a hybrid cloud) to provide the requested quality of service (QoS) to applications and/or users, i.e., if the capex planning should be driven by new local machines or should be driven by coupling with the cloud. Indeed, in one or more cases, an advisor is provided to an IT infrastructure planner (as opposed to applications, jobs, and/or users of the infrastructures) to perform capex planning in expanding locally or over the cloud. One or more embodiments advise based on historical usage, focusing on whether the planner and/or IT provider should invest on expanding its private infrastructure locally (e.g., private cloud) or should expand it over a public cloud; in other words, whether the IT planner would have to buy more machines for the local cluster or buy this capacity from public clouds along the lifecycle or a timeframe.

One or more embodiments analyze local and remote resources usage to give support on future capacity planning. This includes the acquisition and update of local hardware and also cloud allocation. Prior-art solutions only consider current local resources and try to optimize the scheduling of local and remote workload. In addition, other solutions optimize capacity from the point of view of the service provider. None of them helps companies and/or institutions to plan for the future hybrid environment.

Figure 4:
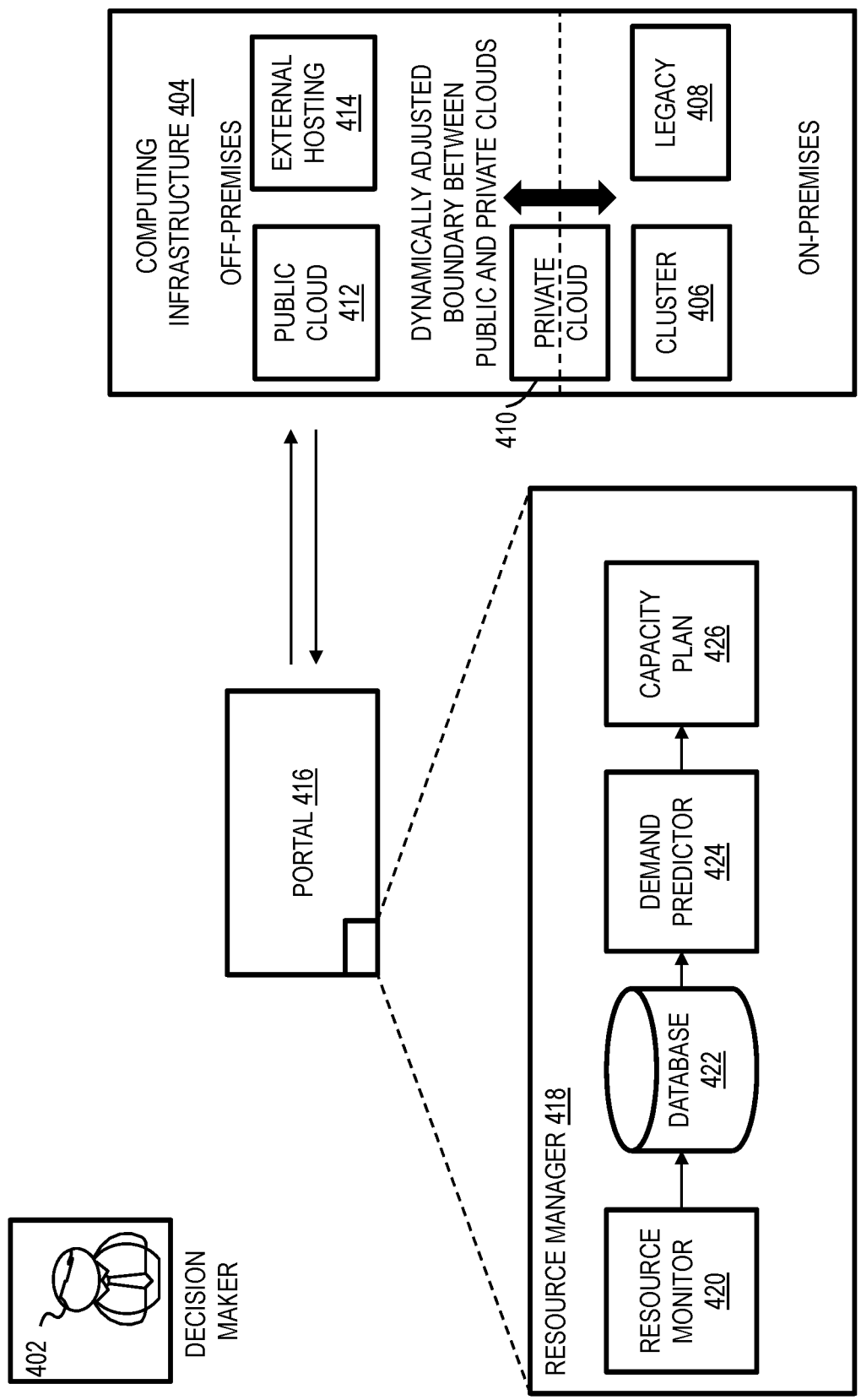
FIG. 4 depicts exemplary system components, according to an aspect of the invention.

Referring to FIG. 4, one or more embodiments provide a system and related methods. The system can be used by an infrastructure planner (user) 402: a user in an institution that is responsible for planning the institution's computational resources (decision maker). The system includes computing infrastructure 404; namely, a hybrid cloud environment including on-premises clusters 406, legacy systems 408, and private clouds 410, as well as and off-premises public cloud(s) 412 and external hosting 414. The system further includes a portal 416 in which the user 402 can have an overview of all of his or her institution's allocated resources. In one or more embodiments, the portal 416 contains a resource manager 418, which employs cloud-based application programming interfaces (APIs) to provision cloud-based resources.

In one or more cases, the resource manager 418 has a resource monitoring component 420 that uses software agents to extract machine-specific metrics, such as central processing unit (CPU) and memory usage, and application-specific metrics, such as transactions executed per second, as well as queueing information when monitoring cluster management applications. The resource manager 420 connects to a database 422 in which it stores resource monitoring historical information. The resource manager 418 has a demand predictor component 424, which uses the historical usage information to predict future computing resource usage. The demand predictor component, in one or more embodiments, uses the method described below to estimate mean demand for a given time frame, and proposes the optimal (based on its prediction) amount of on-premises computing power necessary to minimize costs of hybrid cloud operation. After the predicted demand is found, that information is fed into the method here described, which generates an allocation suggestion of on-premises resources, to minimize fixed costs, in the form of a capacity plan 426.

In one or more embodiments, the system monitors the usage of currently running computing systems. There are many ways in which this can be accomplished. For instance, in a low level, the system can monitor CPU, memory and input/output (I/O) usage to determine system occupancy. Another example is to check queue data such as waiting time. In the application level, the system can also determine occupancy by examining how many tasks and/or queries are issued.

The raw monitored data then is aggregated in a load metric. For example, a load average over time can be computed with a moving average to estimate how many processes, tasks, and/or jobs are in a runnable state. A threshold range can be then established to determine how loaded the processors are. Other load metrics can also consider memory, network, and/or job queue in addition to only processors.

Based on that, one or more embodiments define a demand function that forecasts the future demand of the hybrid cloud. One possible way to construct a forecasting component is by using a statistical method based on historical data matching demand in a business specific scenario (e.g. in an oil and gas company, volume of production for a given field) to computation resources required. With such a function, the expected change in future demand can be input to provide the expected amount of computational resources; expected projects and/or workload of the company or other institution's departments; and/or expected growth of the business. One or more embodiments define a cost function that computes the premium of the cloud usage. This usage is related to the unserved demand by the local resources. In addition, the cost includes the total cost of ownership of current and future estimated local resources. This results in an output that is a function of resources that minimizes accumulated cost of ownership and premium paid to cloud resources to meet the unserved demand. With the resources function, one or more embodiments provide capacity planning for the user and/or institution.

One pertinent goal in one or more embodiments is to optimize a cost function that includes a local component and a cloud component. For example, minimize:

$$f(O) = OBT + \int_0^T \max(D(t) - O, 0) \, UB \, dt$$

where:
O is the demand served by on-premises resources (the decision variable);
B is the baseline cost for owned resources;
T is the amount of time of an evaluation period (e.g., IT buying window);
D(t) is the demand function; and
U is the premium paid for cloud usage.

However, in one or more embodiments, the decision variable O cannot be adjusted for the current life-cycle (current buying-window), only for future life-cycles (future buying windows). The user and/or institution has already set the current O by buying (or previously upgrading) the current on-premises resources. One or more embodiments focus on cost optimization for the next cycle (next window). In order to achieve that, a Demand function D(t) is predicted. Such function is predicted with the usage data collected by the monitoring system (recent past executions). Embodiments of this phase include machine learning algorithms such as K nearest neighbors, Bayesian neural networks, or the like, and system identification methods.

Figure 5:
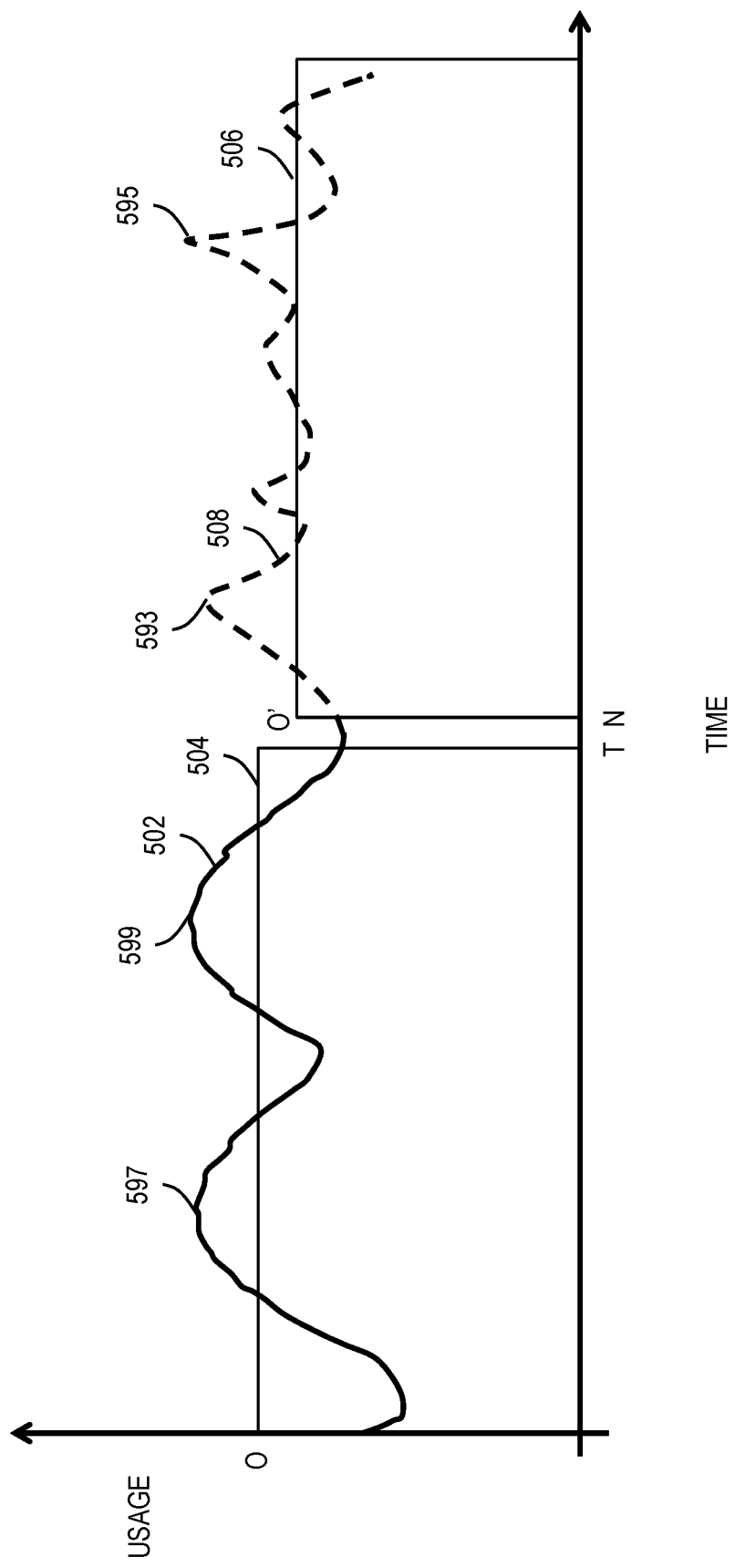
FIG. 5 shows current and predicted demand, according to an aspect of the invention.

Once the user has estimated the demand function, the cost function can be optimized. The result of such optimization is the amount of computational resources that are to be acquired for the on-premises environment. The peak demand is served by the cloud. FIG. 5 depicts the described scenario. T is the limit of the current life-cycle, in which the solid curve 502 represents actual load demand and the area 504 represents the maximum load that can be served locally (the actual demand served locally is O). Peaks 597, 599 are served by the cloud.

The next cycle starts at time N and has predicted demand represented by the dashed line 508. The optimal demand is computed in accordance with aspects of the invention and is labelled O'. The user uses a method and/or system in accordance with aspects of the invention to optimize the load served by the local resources in the next life-cycle area 506 and served by the cloud peaks 593, 595. In order to do that, one or more embodiments predict the demand (dashed line 508) and then determine the optimal load served in the cloud or locally (O').

Once the suggested capacity planning for the on-premises data center is deployed for time cycle N onwards, possible future on-premises processing overflow (e.g., based on growing waiting time queue due to growing requests) is placed on the cloud (off-premises) to achieve the user service level agreement (SLA). Ideally, to minimize costs, the local capacity is desired to be fixed for a long time frame. However, applications would demand more and more from the infrastructure over the time. It is thus desired that O' is calculated in quite small lifetime cycles (time frames) so that O' can dynamically deal with real-time changes in demand and scenarios, i.e., O' is self-adaptive and dynamically changes the amount of on-premises computing power necessary to minimize costs of hybrid cloud operation. This can be done by automatically calculating O' when the demand predictor detects an overflow.

One or more embodiments thus provide a system, method, and/or apparatus for hybrid cloud operation planning and optimization. One or more embodiments are useful in a hybrid cloud environment. Some studies have shown that the hybrid cloud approach is cost optimal. The average load is handled locally, with burst peaks to the cloud. One or more embodiments are advantageously directly accessible, with no single point-of-failure.

It is worth noting when architecting such systems that in accordance with applicable regulations, some data cannot cross country boundaries.

One common approach is to run peaks of demand in the cloud and the regular workload in the private cloud; while another approach is to run some workload in the private cloud to comply with regulations and run most of the other workloads in the public cloud. Many strategies have been proposed to optimize the usage of both environments; nevertheless, using current techniques, the resources may not be well dimensioned despite these strategies. For example, if the on-premises equipment is super dimensioned, the local resources may be underutilized. It will thus be appreciated that dimensioning hybrid cloud environments is a challenging task that involves investment planning.

Indeed, the decision maker 402 may not have the full picture of the cloud needs of the company, and currently, there is no tool to help him or her to make the decisions.

It is worth noting that prior art techniques typically consider only current local resources and try to optimize the scheduling of local and remote workload. In addition, other prior art solutions optimize capacity from the point of view of the service provider. None of them helps companies and/or institutions (as opposed to cloud service providers) to plan for the future hybrid environment.

As discussed with regard to FIG. 4, one or more embodiments analyze and predict demand, and the local and remote resources usage to give support on future capacity planning. This includes the public and private cloud allocation and acquisition and update of local resources. The functions of the resource manager 418 include, for example, creating a mapping between the current business demand and the computational resources used (FLOPS (floating point operations per second), memory, storage, etc.); predicting future computational resources based on current ones and prediction of the business growth (given as input); and/or optimizing hybrid cloud future allocations.

In one or more embodiments, monitoring component 420 monitors the computational resources usage (e.g. MFLOPS, storage, memory etc.). It relates the current demand (e.g. Oil fields, patients, client portfolio etc.) with the current resources usage by the company or other institution (e.g. Oil Company, hospital, bank etc.). This relationship is used later to forecast resources demand.

Usage of currently running systems is monitored in one or more embodiments. There are many ways in which this can be accomplished. For instance, in a low level, the system can monitor CPU, memory, and/or I/O usage to determine system occupancy. Another example is to check queue data such as waiting time. In the application level, the system can also determine occupancy by examining how many tasks and/or queries are issued. The method and/or system monitors the evolution of business demand. The demand monitoring is specific to the particular business, in one or more embodiments. For example, in an oil company this might mean the number of fields and/or other assets to manage, and the like. For a hospital, this means patients, procedures, exams, and so on. For a bank, this means number of clients, transactions, etc.

In one or more embodiments, the method and/or system associates resource usage with the current demand. For example, for an oil company, the system associates the number of MFLOPS required to process a field. For a hospital, the association might be how much storage a patient requires. For a bank, the association might be how many transactions are required by a portfolio.

Consider demand predictor 424. One or more embodiments aim to predict computational demand. In order to do that, one or more embodiments rely on the growth predictions that companies already make for their businesses. A predictive model can be built with the growth model and the monitored current business demand and resource used.

FIG. 6 shows a table of current and future predicted demand-related parameters (fields, patients, clients) and computing resources.

The following are non-limiting examples of techniques that can be used to predict the future demand:
Neural networks;
Linear regression;
Tree-based methods;
Deterministic methods;
Support Vector Machines (SVM).

Furthermore, combinations of these methods can be used to enhance performance.

The future baseline cost of local resources and future cloud price can also be predicted using a similar methodology.

One or more embodiments thus provide a system and/or method for capacity planning of hybrid clouds, including resource monitoring strategy; a method for forecasting the resource usage in both cloud and on-premises; an optimization method; and allocation and investment planning.

Given the discussion thus far, it will be appreciated that an exemplary method, according to an aspect of the invention, includes the step of monitoring resource usage for a hybrid cloud computing environment 404 having on-premises computing resources and off-premises computing resources, for at least a first time period. The method further includes, for the at least first time period, relating an amount of the on-premises computing resources and off-premises computing resources to a demand for computing services from the hybrid cloud computing environment. An even further step includes predicting future demand for computing services from the hybrid cloud computing environment, based on the relating step and a learned function of the demand and/or a projection of future business growth for a business utilizing the on-premises computing resources and the off-premises computing resources in the hybrid cloud computing environment.

An even further step includes dynamically optimizing, based on the predicted future demand, an amount of the on-premises computing resources for a future time period, so as to minimize costs for the future time period. A still further step includes provisioning new amounts of on-premises computing resources and off-premises computing resources, for the future time period, in accordance with the optimizing step.

The provisioning step can be carried out, for example, by using cloud-based application programming interfaces of a resource manager 418 to provision the off-premises computing resources for the future time period.

The monitoring step can be carried out, for example, with a resource monitor 420 of the resource manager 418. The resource monitor can be implemented, for example, via software agents. The software agents can, for example, extract machine-specific metrics comprising at least one of central processing unit usage, memory usage, and input/output usage. Alternatively or additionally, monitoring can be carried out for at least one of load metrics, wait times, number of tasks, and number of queries.

In one or more embodiments, predicting the future demand comprises predicting a demand function with a machine learning algorithm (e.g., K nearest neighbors, neural networks, linear regression, tree-based methods, deterministic methods, and/or support vector machines). The predicting can be carried out, for example, with a demand predictor 424 of the resource manager.

The amount of computing resources can be related to the demand for computing services from the hybrid cloud computing environment by the resource monitor 420 and demand predictor 424, as discussed above (see discussion of MFLOPS per oil field, storage per hospital patient, and transactions per portfolio, e.g.). Demand predictor 424 extracts demand records from database 422 and uses predictive methods, as discussed earlier, to forecast the demand for computing services.

The optimizing step can be carried out, for example, by minimizing f(O) as described above, using demand predicator 424.

Even further, given the discussion thus far, it will be appreciated that an exemplary non-transitory computer readable medium, according to further aspect of the invention, includes computer executable instructions which when executed by a computer cause the computer to perform any one, some, or all of the method steps described herein. These instructions, when loaded into a memory, configure one or more processors to create at least a portion of the apparatuses shown in the figures and discussed herein.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments can be at least partially implemented in the context of a cloud or virtual machine environment. Reference is made back to FIGS. 1-3 and accompanying text. For example, some embodiments could be made available as a service in a cloud, and/or could be used to determine how on-premises resources will be dynamically re-dimensioned to deal with demand.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks shown in FIG. 4. The resource monitor 420 corresponds to the module that monitors the current demand of the existing on-premises and cloud resources. All data collected by the resource monitor 420 is stored in a database 422 so that the demand predictor 424 can access and estimate the future demand. The capacity plan module 426 is responsible for dynamically dimensioning the next environment (both local and cloud) using the prediction from demand predictor 424.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
monitoring resource usage for a hybrid cloud computing environment having on-premises computing resources and off-premises computing resources, for at least a first time period;
aggregating raw monitored data in a load metric;
computing a load average over time with a moving average to estimate a count of processes and tasks that are in a runnable state;
for said at least first time period, relating an amount of said on-premises computing resources and an amount of off-premises computing resources to a demand for computing services from said hybrid cloud computing environment;
dynamically predicting future demand for computing services from said hybrid cloud computing environment, based on said relating step and at least one of a learned function of said demand and a projection of future business growth for a business utilizing said on-premises computing resources and said off-premises computing resources in said hybrid cloud computing environment, wherein said dynamically predicting of said future demand comprises predicting a demand function with a machine learning algorithm, wherein said dynamically predicting is carried out with a demand predictor of said resource manager, and wherein said dynamically predicting further comprises estimating a mean demand for a given time frame based on the projection of future business growth;
dynamically optimizing, based on said predicted future demand and an amount of demand for said off-premises computing resources for a future time period, an amount of said on-premises computing resources for said future time period, so as to minimize costs for said future time period;

provisioning new amounts of on-premises computing resources and off-premises computing resources, for said future time period, in accordance with said optimizing step; and operating the hybrid cloud environment in accordance with the newly provisioned amounts, wherein the dynamic optimization further comprises optimizing a cost function that includes a local component and a cloud component based on:

$$f(O) = OBT + \int_0^T \max(D(t) - O, 0) UB \, dt$$

where:
O is a demand served by the on-premises computing resources;
B is a baseline cost for owned resources;
T is an amount of time of an evaluation period;
D(t) is the demand function; and
U is a premium paid for cloud usage.

2. The method of claim 1, wherein said provisioning step comprises at least using cloud-based application programming interfaces of a resource manager to provision said off-premises computing resources for said future time period.

3. The method of claim 2, wherein said monitoring step is carried out with a resource monitor of said resource manager.

4. The method of claim 3, wherein said resource monitor is implemented via software agents.

5. The method of claim 4, wherein said software agents extract machine-specific metrics comprising at least one of central processing unit usage, memory usage, and input/output usage.

6. The method of claim 3, wherein said monitoring comprises monitoring at least one of load metrics, wait times, number of tasks, and number of queries.

7. The method of claim 1, wherein said machine learning algorithm comprises at least one of K nearest neighbors, neural networks, linear regression, tree-based methods, deterministic methods, and support vector machines.

8. A non-transitory computer readable medium comprising computer executable instructions which when executed by a computer cause the computer to perform the method of:
monitoring resource usage for a hybrid cloud computing environment having on-premises computing resources and off-premises computing resources, for at least a first time period;
aggregating raw monitored data in a load metric;
computing a load average over time with a moving average to estimate a count of processes and tasks that are in a runnable state;
for said at least first time period, relating an amount of said on-premises computing resources and an amount of off-premises computing resources to a demand for computing services from said hybrid cloud computing environment;
predicting future demand for computing services from said hybrid cloud computing environment, based on said relating step and at least one of a learned function of said demand and a projection of future business growth for a business utilizing said on-premises computing resources and said off-premises computing resources in said hybrid cloud computing environment, wherein said dynamically predicting of said future demand comprises predicting a demand function with a machine learning algorithm, wherein said dynamically predicting is carried out with a demand predictor of said resource manager, and wherein said dynamically predicting further comprises estimating a mean demand for a given time frame based on the projection of future business growth;

dynamically optimizing, based on said predicted future demand and an amount of demand for said off-premises computing resources for a future time period, an amount of said on-premises computing resources for said future time period, so as to minimize costs for said future time period;

provisioning new amounts of on-premises computing resources and off-premises computing resources, for said future time period, in accordance with said optimizing step; and operating the hybrid cloud environment in accordance with the newly provisioned amounts, wherein the dynamic optimization further comprises optimizing a cost function that includes a local component and a cloud component based on:

$$f(O) = OBT + \int_0^T \max(D(t) - O, 0) UB \, dt$$

where:
O is a demand served by the on-premises computing resources;
B is a baseline cost for owned resources;
T is an amount of time of an evaluation period;
D(t) is the demand function; and
U is a premium paid for cloud usage.

9. The non-transitory computer readable medium of claim 8, wherein said provisioning step of said method comprises at least using cloud-based application programming interfaces of a resource manager to provision said off-premises computing resources for said future time period.

10. The non-transitory computer readable medium of claim 9, wherein said monitoring step is carried out with a resource monitor of said resource manager.

11. The non-transitory computer readable medium of claim 10, wherein said resource monitor is implemented via software agents.

12. The non-transitory computer readable medium of claim 11, wherein said software agents extract machine-specific metrics comprising at least one of central processing unit usage, memory usage, and input/output usage.

13. The non-transitory computer readable medium of claim 10, wherein said monitoring comprises monitoring at least one of load metrics, wait times, number of tasks, and number of queries.

14. The non-transitory computer readable medium of claim 8, wherein said machine learning algorithm comprises at least one of K nearest neighbors, neural networks, linear regression, tree-based methods, deterministic methods, and support vector machines.

15. An apparatus comprising:
a memory; and
at least one processor, coupled to said memory, and operative to:
monitor resource usage for a hybrid cloud computing environment having on-premises computing resources and off-premises computing resources, for at least a first time period;

aggregate raw monitored data in a load metric;
compute a load average over time with a moving average to estimate a count of processes and tasks that are in a runnable state;
for said at least first time period, relate an amount of said on-premises computing resources and an amount of off-premises computing resources to a demand for computing services from said hybrid cloud computing environment;
dynamically predict future demand for computing services from said hybrid cloud computing environment, based on said relating step and at least one of a learned function of said demand and a projection of future business growth for a business utilizing said on-premises computing resources and said off-premises computing resources in said hybrid cloud computing environment, wherein said dynamically predicting of said future demand comprises predicting a demand function with a machine learning algorithm, wherein said dynamically predicting is carried out with a demand predictor of said resource manager, and wherein said dynamically predicting further comprises estimating a mean demand for a given time frame based on the projection of future business growth;
dynamically optimize, based on said predicted future demand and an amount of demand for said off-premises computing resources for a future time period, an amount of said on-premises computing resources for said future time period, so as to minimize costs for said future time period;
provision new amounts of on-premises computing resources and off-premises computing resources, for said future time period, in accordance with said optimizing step; and
operate the hybrid cloud environment in accordance with the newly provisioned amounts, wherein the dynamic optimization further comprises optimizing a cost function that includes a local component and a cloud component based on:

$$f(O) = OBT + \int_0^T \max(D(t) - O, 0)UB\,dt$$

where:
O is a demand served by the on-premises computing resources;
B is a baseline cost for owned resources;
T is an amount of time of an evaluation period;
D(t) is the demand function; and
U is a premium paid for cloud usage.

16. The apparatus of claim 15, wherein said provisioning comprises at least using cloud-based application programming interfaces of a resource manager to provision said off-premises computing resources for said future time period.

* * * * *